United States Patent [19]

Nadkarni et al.

[11] Patent Number: 5,254,511
[45] Date of Patent: Oct. 19, 1993

[54] METHOD FOR PRODUCING COMPOSITE CERAMIC STRUCTURES USING DROSS

[75] Inventors: S. K. Nadkarni, Jonquiere; Narasimha S. Raghavan, Kingston, both of Canada

[73] Assignee: Lanxide Technology Company, LP, Newark, Del.

[21] Appl. No.: 919,803

[22] Filed: Jul. 27, 1992

Related U.S. Application Data

[60] Continuation of Ser. No. 617,723, Nov. 26, 1990, Pat. No. 5,134,102, which is a continuation of Ser. No. 429,818, Oct. 31, 1989, Pat. No. 4,985,382, which is a division of Ser. No. 907,935, Sep. 16, 1986, Pat. No. 4,891,345.

[51] Int. Cl.$^5$ .................... C04B 35/10; C04B 35/36; C04B 35/58
[52] U.S. Cl. .................... 501/155; 501/96; 501/102; 501/127; 501/153; 501/154; 264/65
[58] Field of Search ............... 501/155, 96, 102, 127, 501/153, 154; 264/65

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/69 |
| 3,538,231 | 11/1970 | Newkirk et al. | 13/25 |
| 3,551,101 | 12/1970 | Matsuo et al. | 23/192 |
| 3,669,695 | 6/1972 | Iler et al. | 106/43 |
| 3,789,096 | 1/1974 | Church et al. | 264/60 |
| 3,864,154 | 2/1975 | Gazza et al. | 29/123 B |
| 3,973,977 | 8/1976 | Wilson | 106/62 |
| 4,713,360 | 12/1987 | Newkirk et al. | 501/88 |
| 4,851,375 | 7/1989 | Newkirk et al. | 501/127 |
| 4,985,382 | 1/1991 | Nadkarni et al. | 501/155 |
| 5,134,102 | 7/1992 | Nadkarni et al. | 501/155 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 60-127208 | 7/1985 | Japan . |

OTHER PUBLICATIONS

"Oxidation of Molten Aluminum Alloys. Reaction with Refractories"-M. Drouzy and M. Richard-Mar., 1974-Fonderie, France No. 332 pp. 121-128.

"Refractories for Aluminum Alloy Melting Furnaces'-'-B. Clavaud and V. Jost-Sep., 1980-Lillian Brassiling (from French) Jan., 1985.

Primary Examiner—Mark L. Bell
Assistant Examiner—C. M. Bonner
Attorney, Agent, or Firm—Mark G. Mortenson; Jeffrey R. Ramberg

[57] ABSTRACT

The invention relates to ceramic composite articles formed by infiltration of a particulate, permeable bed or permeable preform with a polycrystalline matrix produced as a metal-oxidant reaction product. The bed or preform includes a dross material.

15 Claims, No Drawings

METHOD FOR PRODUCING COMPOSITE CERAMIC STRUCTURES USING DROSS

This is a continuation of copending application Ser. No. 07/617,723 filed on Nov. 26, 1990, which issued on Jul. 28, 1992, as U.S. Pat. No. 5,134,102, which was a continuation of U.S. patent application Ser. No. 07/429,818, filed Oct. 31, 1989 which issued on Jan. 15, 1991, as U.S. Pat. No. 4,985,382, which was a divisional of U.S. patent application Ser. No. 06/907,935, which issued on Jan. 2, 1990, as U.S. Pat. No. 4,891,345 filed Sep. 16, 1986.

FIELD OF THE INVENTION

This invention relates to a novel use of dross in the method for producing a ceramic composite structure. More particularly, this invention relates to an improvement in the method for producing a ceramic composite structure by "growing" a polycrystalline material comprising an oxidation reaction product from a parent metal into a permeable mass of filler comprising comminuted metal dross produced in a metal melting operation.

BACKGROUND

When certain metals or metal alloys are remelted or held in molten state in a furnace or crucible, the metals partially oxidize to form a dross comprising primarily the oxide of that metal and the metal itself, together with smaller quantities of impurities and alloying elements present in the molten metal and/or compounds (such as oxides and halides) of these impurities and alloying elements. The dross floats on the surface of the molten melt body and is separable therefrom by skimming or other techniques. It is usually regarded as a waste product in the metals industry, which has the problem of disposing of copious amounts of the dross, although procedures are known for recovering metal or other values from dross. For example, procedures are known for obtaining usable activated alumina from dross (as disclosed in U.S. Pat. No. 4,075,284), and for converting dross to a usable refractory material by compacting and firing in a kiln (as disclosed in U.S. Pat. No. 4,523,949).

As used herein, the term "dross" means a solid phase material, usually oxide- or nitride-rich, which has formed on the surface of a body of molten metal, or at the three phase junction between the furnace wall, molten metal and gas atmosphere, during a metal melting operation. It is a physical mixture of entrapped metal and a ceramic formed by oxidation. The dross is a thin, weak, floating layer which typically is removed as a waste material by physical separation from the molten metal body, for example by skimming operations.

Dross skimmed from the surface of molten metal may contain as much as 60% by weight metal, some of which forms as large, shapeless inclusions. The dross is usually passed through a crushing operation, and the larger metal pieces are physically separated from the friable ceramic, and the removed metal is returned to the melting furnace. Another source of dross is foundry operations such as the chlorination of reactive metal components of the melt or the addition of foundry fluxes. Dross generated in such operations contains soluble salts which would appear to hamper other uses.

In recent years there has been an increasing interest in substituting ceramics for metals because, with respect to certain properties, ceramics are superior to metals. There are, however, several known limitations or difficulties in making this substitution such as scaling versatility, capability to produce complex shapes, satisfying the properties required for the end-use application, and costs. Many of these limitations or difficulties have been overcome by the inventions disclosed in patent applications assigned to the same assignee as this application and discussed in the subsequent section, which provide novel methods for reliably producing ceramic materials, including shaped composites. A compatible filler for the composite is required for ceramic composites in order to attain the desired end properties.

DESCRIPTION OF COMMONLY OWNED PATENT APPLICATIONS

The following Commonly Owned Patent Applications describe novel methods for producing a self-supporting ceramic body by oxidation of a parent metal to form a polycrystalline material of an oxidation reaction product and, optionally, metallic constituents:

(A) Ser. No. 818,943, filed Jan. 15, 1986, now U.S. Pat. No. 4,713,360, issued Dec. 15, 1987 which is a continuation-in-part of Ser. No. 776,964, filed Sep. 17, 1985, which is a continuation-in-part of Ser. No. 705,787 filed Feb. 26, 1985, which is a continuation-in-part of U.S. application Ser. No. 591,392 filed Mar. 16, 1984, all in the name of Marc S. Newkirk et al and entitled "Novel Ceramic Materials and Methods for Making the Same";

(B) Ser. No. 220,935, filed Jun. 23, 1988, which issued on Aug. 1, 1989, as U.S. Pat. No. 4,853,352, entitled "Method of Making Self-Supporting Ceramic Materials and Materials Made Thereby", which is a continuation of Ser. No. 822,999, filed Jan. 27, 1986, which is a continuation-in-part of Ser. No. 776,965, filed Sep. 17, 1985, which is a continuation-in-part of Ser. No. 747,788, filed Jun. 25, 1985, which is a continuation-in-part of Ser. No. 632,636, filed Jul. 20, 1984, all in the name of Marc S. Newkirk et al and entitled "Methods of Making Self-Supporting Ceramic Materials"; and (C) Ser. No. 819,397, which issued on Jul. 25, 1989, as U.S. Pat. No. 4,851,375, entitled "Method of Making Composite Ceramic Articles Having Embedded Filler" filed Jan. 17, 1986, which is a continuation-in-part of Ser. No. 697,876, filed Feb. 4, 1985, both in the name of Marc S. Newkirk et al and entitled "Composite Ceramic Articles and Methods of Making Same".

(D) Ser. No. 861,024, filed May 8, 1986, now U.S. Pat. No. 4,923,832, which issued on May 8, 1990, in the name of Marc S. Newkirk et al and entitled "Method of Making Shaped Ceramic Composites with the Use of a Barrier".

The entire disclosures of each of the aforesaid Commonly Owned Patent Applications and Patents are incorporated herein by reference.

As explained in these Commonly Owned Patent Applications and Patents, novel polycrystalline ceramic materials or polycrystalline ceramic composite materials are produced by the oxidation reaction between a parent metal and a vapor-phase oxidant, i.e. a vaporized or normally gaseous material, as an oxidizing atmosphere. The method is disclosed generically in the aforesaid Commonly Owned Patent Applications and Patents "A". In accordance with this generic process, a parent metal, e.g. aluminum, is heated to an elevated temperature above its melting point but below the melting point of the oxidation reaction product to form a body of molten parent metal which reacts upon contact with a vapor-phase oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. In the case of an oxide as the oxidation reaction product, oxygen or gas mixtures containing oxygen (including air) are suitable oxidants, with air usually being preferred for obvious reasons of economy. However, oxidation is used in its broad sense in all of the Commonly Owned Patent Applications and Patents in this application, and refers to the loss or sharing of electrons by a metal to an oxidant which may be one or more elements and/or compounds. Accordingly, elements other than oxygen, or compounds, may serve as the oxidant, as explained below in greater detail.

In certain cases, the parent metal may require the presence of one or more dopants in order to favorably influence or facilitate growth of the oxidation reaction product, and the dopants are provided as alloying constituents of the parent metal. For example, in the case of aluminum as the parent metal and air as the oxidant, dopants such as magnesium and silicon, to name but two of a larger class of dopant materials, are alloyed with aluminum and utilized as the parent metal. The resulting oxidation reaction product comprises alumina, typically alpha-alumina.

The aforesaid Commonly Owned Patent Applications and Patents "B" disclose a further development based on the discovery that appropriate growth conditions as described above, for parent metals requiring dopants, can be induced by applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. With this improvement, it is feasible to use commercially available metals and alloys which otherwise would not contain or have appropriately doped compositions. This discovery is advantageous also in that ceramic growth can be achieved in one or more selected areas of the parent metal's surface rather than indiscriminately, thereby making the process more efficiently applied, for example, by doping only one surface, or only portion(s) of a surface, of a parent metal.

Novel ceramic composite structures and methods of making them are disclosed and claimed in the aforesaid Commonly Owned Patent Applications and Patents "C" which utilize the oxidation reaction to produce ceramic composite structures comprising a substantially inert filler infiltrated by the polycrystalline ceramic matrix. A parent metal positioned adjacent to a mass of permeable filler is heated to form a body of molten parent metal which is reacted with a vapor-phase oxidant, as described above, to form an oxidation reaction product. As the oxidation reaction product grows and infiltrates the adjacent filler material, molten parent metal is drawn through previously formed oxidation reaction product into the mass of filler and reacts with the oxidant to form additional oxidation reaction product at the surface of the previously formed product, as described above. The resulting growth of oxidation reaction product infiltrates or embeds the filler and results in the formation of a ceramic composite structure of a polycrystalline ceramic matrix embedding the filler.

As disclosed in the copending U.S. patent application Ser. No. 861,024, the growth of the ceramic oxidation reaction product can be essentially limited to the permeable body of filler by coating the termination surfaces of the body with a barrier material which locally prevents or inhibits the continuation of the growth process. In the case of the Al parent metal, calcium-containing substances such as Plaster of Paris or a calcium sulfate-calcium carbonate mixture, Portland Cement (calcium-aluminate-silica), and Wollastonite (calcium-silicate), which typically are rendered permeable, are useful barrier materials. 304 Stainless steel, typically as mesh such as AISI 304 and about 22 gauge, also has proven to be a useful barrier.

Thus, the aforesaid Commonly Owned Patent Applications and Patents describe the production of polycrystalline ceramic products, including ceramic composites, readily "grown" to desired thicknesses heretofore believed to be difficult, if not impossible, to achieve with conventional ceramic processing techniques. The present invention provides a further improvement in the production of ceramic composite products.

SUMMARY OF THE INVENTION

This invention relates to an improved method for producing a polycrystalline ceramic composite by infiltrating a permeable mass or bed of filler with a ceramic matrix comprising a polycrystalline oxidation reaction product grown by the oxidation of a molten parent metal substantially as outlined in the aforesaid Commonly Owned Patent Applications and Patents. The metal dross formed as waste or as an undesired by-product during melting and foundry operations offers a useful source of filler, and further provides for enhanced kinetics and improved morphology, as described below in greater detail.

In the practice of this invention, a parent metal is heated in the presence of an oxidant to form a body of molten metal which is in contact with a bed of permeable filler. In practicing the present invention, the oxidant may be solid, liquid, or vapor-phase, or mixtures thereof, as explained below in detail. Oxidation reaction product is formed as molten metal contacts the oxidant, and the process conditions are maintained to progressively draw molten metal through the formed oxidation reaction product and toward the oxidant so as to continuously form oxidation reaction product which infiltrates the filler.

The heating step is conducted at temperatures above the melting point of the parent metal but below the melting temperature of the oxidation reaction product and heating is continued for such time as is necessary to produce a polycrystalline ceramic composite of the desired size. The resulting ceramic body may include one or more metallic constituents such as nonoxidized parent metal and/or voids or both.

The improvement of this invention is based on the discovery that a self-supporting ceramic composite can be obtained by utilizing as filler a comminuted metal dross formed during metal melting operations. A mass or bed of this filler is formed as a permeable body, that is, a body permeable therein to the growth of the oxidation reaction product of the parent metal, and may comprise a particulate bed or a permeable preform. The metal dross is prepared by (1) crushing or milling the dross to a fine particle size and screening the resultant powder into appropriate size fractions; (2) analyzing the dross and adjusting it to the desired chemical composition; and (3) preparing an aggregate for the permeable body, which may be blended with other filler constituents or materials and/or dopants, and optionally formed into a shaped preform. Where desired, the initiation surface(s) of the preform in contact with parent metal body is coated with additional dopant material. Also, the boundaries or termination surfaces of the preform may be coated with a barrier material to provide a net-shape ceramic composite. A mass of the resulting filler, preferably shaped as a permeable preform, is placed adjacent to or oriented relative to a parent metal and subjected to the oxidation reaction process. This reaction process is continued for a time sufficient to infiltrate at least a portion of the filler body with the polycrystalline oxidation reaction product so that a ceramic composite structure of the desired dimensions can be obtained.

More specifically, a parent metal is positioned or oriented relative to the permeable mass of filler material so that formation of the oxidation reaction product will occur in a direction towards and into the mass of filler. The growth of oxidation reaction product infiltrates or embeds the mass of filler thereby forming the desired composite ceramic structure. The filler may be a loose or bonded array characterized by interstices, openings or intervening spaces, and the bed or mass is permeable to the vapor-phase oxidant and to the growth of oxidation reaction product. As used herein and in the appended claims, "filler" or "filler material" is intended to mean either a homogeneous composition or a heterogeneous composition comprised of two or more materials. Thus, the filler derived from dross may have admixed with it one or more additional filler materials customarily employed in the manufacture of ceramic composites. Still further, the parent metal used in producing the final composite product may be substantially the same or different in composition as the dross-forming metal which forms the dross used for the filler.

The oxidation reaction product grows into the filler without disruption or displacement as a result of which a relatively dense composite ceramic structure is formed without the use of high temperatures and high pressures characteristic of other processes for making ceramic matrix composites. The ceramic composites which are produced by the present invention exhibit highly desirable electrical, wear, thermal and structural characteristics and they may be machined, polished, ground, or the like to afford products which have a variety of industrial applications.

In this specification and the appended claims the following terms have the following meaning:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant, dopant, or a reducible filler admixed with the dross filler, most typically within the range of from about 1–40% by volume, but may include still more metal.

"Oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or more metals with an oxidant such as oxygen, nitrogen, a halogen, sulphur, phosphorus, arsenic, carbon, boron, selenium, tellurium, and compounds and combinations thereof, for example, ammonia, methane, ethane, propane, acetylene, ethylene, propylene and mixtures such as air, $N_2/H_2$, $H_2/H_2O$ and $CO/CO_2$, the latter two (i.e., $H_2/H_2O$ and $CO/CO_2$) being useful in reducing the oxygen activity of the environment.

"Oxidant" means one or more electron acceptors or electron sharers, and may be an element, a combination of elements, a compound, or a combination of compounds, and is a vapor, solid or liquid at the process conditions.

"Parent metal" refers to that metal, e.g. aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g. aluminum, the metal identified should be read with this definition in mind unless indicated otherwise by the context.

Further features and advantages of the invention will be apparent from the detailed description hereinbelow set forth.

DETAILED DESCRIPTION OF THE INVENTION AND PREFERRED EMBODIMENTS

In accordance with the present invention for producing self-supporting ceramic composites; a parent metal is heated in a molten state in the presence of an oxidant to form an oxidation reaction product which infiltrates a bed or mass of filler. The filler utilized comprises a metal dross comminuted and screened to an appropriate particle size. Examples of commercially melted metals and alloys which form drosses and are suitable for the present purpose are based on aluminum, titanium, zinc, magnesium, and copper. Drosses derived from alloys are particularly suitable for use as a filler material, for example, those derived from aluminum/magnesium alloys, copper/tin alloys (bronzes), copper/aluminum alloys (aluminum bronzes), copper/zinc alloys (brasses), copper/nickel and copper/nickel/iron alloys. The use of alloy drosses is of particular advantage because the alloying elements frequently provide the dopants required for ceramic matrix growth as hereinbelow described.

A nitride dross is useful in producing composite ceramic materials by oxidation reaction of the molten parent metal in a nitrogen atmosphere, substantially as disclosed in Commonly Owned U.S. patent application and patent "C". In a melting operation, the molten metal or alloy in contact with a nitrogen-bearing atmosphere such as nitrogen gas, ammonia, or forming gas ($N_2/H_2$ mixture) will form a nitride dross. Alloys on which nitride dross forms readily are based on aluminum, silicon, titanium, and zirconium. The use of such nitride dross makes use of what would usually be a waste product as a valuable filler material.

Fillers comprising dross exhibit an affinity for the oxidation reaction product grown during the process for producing the final composite product, apparently attributable to an affinity between like substances under the process conditions; that is, there is an apparent affinity for growing reaction product into appropriately chosen metal dross. Because of this affinity, we have observed enhanced growth kinetics, and consequently growth occurs at a somewhat faster rate relative to substantially the same process using an inert filler.

One factor which appears to contribute to these improved characteristics is the presence of a dopant material intimately associated with the filler. For example, the dross-forming metal may contain one or more alloying constituents useful as a dopant material(s) for promoting the oxidation reaction of the parent metal. Such materials are dispersed through part or all of the dross, and may be intimately bonded with the microstructure of the ceramic component of the dross or may be alloyed with the primary metallic component of the dross. When the dross is comminuted for use as a filler, this dopant material incorporated as part of the filler now serves as a useful dopant in the production of the final composite product. For example, silicon is a common constituent in aluminum alloy, and silicon is a useful dopant for the oxidation reaction of aluminum in air. A significant percentage of silicon will alloy with the aluminum in the dross. When this dross is used as a filler, this filler material now contains a built-in dopant for use in making an alumina composite. As a further example, dross from magnesium-containing aluminum alloys includes magnesium values (MgO, $MgAl_2O_4$, and metallic aluminum with a high Mg content) having efficacy as a dopant for the oxidation reaction of aluminum with either oxygen or nitrogen oxidant.

The affinity of the primary metal of the dross for the oxidant should also be considered for the present invention. Metals are often referred to as being more or less noble. "Noble" in this case refers to the affinity of the metal for a particular oxidizing agent, i.e. the lower the tendency of the metal to oxidize, the more noble it is. Thus, when a layer of dross is formed on the surface of a metal alloy, the less noble components of that alloy tend to be concentrated in the ceramic phase of that dross. For example, when aluminum-magnesium-silicon alloys are oxidized, the ceramic phase of the dross tends to contain the compounds of magnesium-oxide and aluminum-oxide.

As mentioned above, the magnesium values of the dross provide a highly efficient dopant for aluminum oxidation, and further promote wetting of the filler and the reaction product by the aluminum parent metal. The more noble silicon tends to be concentrated in the residual metal trapped in the dross. Further, when a noble metal oxide is put in contact with a less noble molten metal, it is typically reduced forming the oxide of the less noble metal and the alloy between the reduced noble metal and the residual content of the less noble metal. Intermetallic compounds may then form within the metal alloy between the more noble metal and the less noble metal. For example, when copper/iron/nickel alloy dross containing oxides of the dross-forming alloy constituents is put in contact with a body of molten aluminum parent metal, the result is the formation of aluminum-oxide ceramic phase, and aluminum/copper/iron/nickel metallic alloy. Aluminum/copper intermetallic precipitates are formed within the alloy on cooling. Further, the reduction of the noble metal oxide provides a solid source of oxidizing agent, which tends to promote the prompt and uniform initiation of the vapor-phase oxidation process.

The addition of alloying elements into the residual metal phase in the ceramic composite may improve the properties of the composite, such as strength, strength retention at temperature, and maximum use temperature. In some cases, total replacement of the low melting aluminum parent metal by the higher melting metals such as Fe, Ni, Cu, or Si is possible.

The dross used as the source of filler for the final composite product is comminuted to the desired size as by impact milling, roller milling, gyrating, crushing or other conventional techniques depending largely upon the particle size desired and the composition of the polycrystalline material. The ground or milled dross is sized and recovered for use as a filler. It may be desirable to first crush the dross into large pieces of about ¼ inch to ½ inch as with a jaw crusher, hammer mill, etc., and then into finer particle of 50 mesh or finer as by impact milling. The particulate is typically screened to obtain fractions of desired size. Suitable fillers may range in size from 100 to 500 mesh or finer depending upon the ceramic composite to be made and its end use.

As explained above, the dross may contain metallic components such as nonoxidized dross-forming metal. The amount of metal can vary over a wide range of 30 to 60 percent by weight, and sometimes higher, depending largely upon the efficiency of the metal skimming operation. It may be desirable to separate at least part of the metal from the ceramic portion of the dross before using the material as a filler. This separation can be conveniently achieved after the metal dross has been crushed or ground. The ceramic phase of the dross is usually more easily fractured than the metal, and it therefore may be possible in some cases to partially separate the two constituents by comminuting and screening. The comminuted fraction containing the greater amount of ceramic phase (or the comminuted dross with no metal separation) may then be treated chemically in one or more steps to remove the metal. For example, the comminuted material first may be acid-leached to remove certain metals (e.g. aluminum), washed, then caustic leached to remove other metals (e.g. silicon), washed again, and a relatively metal-free dross is recovered.

Also, any nonoxidized metal present in the dross filler will be in particulate form. If the dross-forming metal is the same as the parent metal or has higher affinity for the oxidant, i.e. is less noble, such metal will undergo oxidation reaction leaving voids in the ceramic matrix corresponding in size to the metal particles. Such voids disposed throughout the ceramic matrix may or may not be desirable depending upon the properties sought for the composite and its end use. If a high volume percent of voids is desirable for the end product, such as for increasing the thermal insulation of the composite, it would be advantageous to use a large amount of filler having non-oxidized parent metal. This built-in porosity can be restricted to a portion of the composite only by forming a layered bed of filler comprising (1) filler with particulate metal and (2) the relatively pure filler (metal removed) or filler from another source.

Dross typically has a variable composition depending on the particular metal alloy precursor for the dross. In order to use such dross as a filler for a ceramic-composite body, it may be desirable to control its composition. This may be accomplished by crushing the dross and blending it at the fine particle size in order to homogenize its composition. The composition is then chemically analyzed and, if desired, is adjusted to a composition target by the addition of other constituents of known composition in either powder or liquid form. The dross, now of known and controlled composition, may be mixed with other filler materials such as particulates, fibers, platelets, rods, whiskers, spheres, bubbles, metal wool, wires, aggregate, bars, wire cloth, pellets, tubes, refractory fiber, flakes, powders, hollow bodies, etc., and the like, to form the permeable filler body. Where desired, the permeable filler body can be shaped into a permeable preform.

It will be observed that in accordance with the present invention, the dross-forming oxidant may be substantially the same or different from the oxidant used in producing the final ceramic composite product. This may be desirable in that it affords the use of a filler having the several advantages enumerated above, but the oxidation reaction product is different in chemical composition. For example, by this embodiment it is possible to make an alumina dross filler body and form the ceramic product by infiltrating that body with a nitridation reaction product of aluminum parent metal, resulting in alumina-filled aluminum nitride matrix composite, as described more fully below in the Examples.

Although the present invention is described herein with particular emphasis on systems wherein aluminum or an aluminum alloy is employed as the parent metal and alumina is the intended oxidation reaction product, this reference is for exemplary purposes only, and it is to be understood that the present invention is adaptable by application of the teachings herein to other systems wherein other metals such as tin, silicon, titanium, zirconium, etc., are employed as the parent metal. Further, the intended oxidation reaction product may be metal oxide, nitride, boride, carbide, and the like, of the parent metal.

In somewhat greater detail, the parent metal and a permeable mass of filler material comprising metal dross are positioned adjacent to each other and oriented with respect to each other so that growth of the oxidation reaction product as described above will be in a direction towards the filler material in order that the filler, or a part thereof, will be infiltrated by the growing oxidation reaction product and embedded therein. This positioning and orientation of the parent metal and filler with respect to each other may be accomplished by simply embedding a body of parent metal within a bed of particulate filler material or by positioning one or more bodies of parent metal within, on or adjacent to a bed or other assembly of filler material. The assembly is arranged so that a direction of growth of the oxidation reaction product will permeate or infiltrate at least a portion of the filler material. The filler may also comprise, for example, admixed powders or other particulates, aggregate, refractory fiber, tubules, whiskers, spheres, platelets, or the like or a combination of the foregoing. Further, suitable filler materials may include, for example, metal oxides, nitrides or carbides such as alumina, magnesia, hafnia, zirconia, silicon carbide, silicon nitride, zirconium nitride, titanium nitride, etc., as explained in the Commonly Owned Patent Applications.

The setup of parent metal and filler, arranged in a suitable fractory container, is placed in a furnace in the presence of an oxidant, such as a gas oxidant (e.g. air). This setup is heated to temperatures below the melting point of the oxidation reaction product but above the melting point of the parent metal which, for example, in the case of aluminum using air as the oxidant, is generally between about 850°–1450° C. and more preferably between about 900°–1350° C. Within this operable temperature interval or range, a body or pool of molten metal forms, and on contact with the oxidant, the molten metal will react to form a layer of oxidation reaction product. Upon continued exposure to the oxidizing environment, molten metal is progressively drawn into and through any previously formed oxidation reaction product in the direction of the oxidant, and towards and into the adjacent mass of filler. On contact with the oxidant, the molten metal will react to form additional oxidation reaction product, which continues to form within the mass of filler, and thus form a progressively thicker oxidation reaction product while, optionally, leaving metallic constituents dispersed through the polycrystalline oxidation reaction product material. The reaction process is continued for a time sufficient so that oxidation reaction product infiltrates at least a portion of the bed, or to the desired boundary of the preform, thereby forming the ceramic composite. It is to be noted that, in the method of the invention, although the dross typically maintains some quantity of unreacted metal, the matrix-forming reaction is primarily that occurring between infiltrating metal from the parent metal body and the supplied oxidant. The resulting polycrystalline composite matrix material may exhibit porosity which may be a partial or nearly complete replacement of the metal phase(s), but the volume percent of voids will depend largely on such conditions as temperature, time, type of parent metal, and dopant concentrations. Typically in these polycrystalline ceramic structures, the oxidation reaction product crystallites are interconnected in more than one dimension, preferably in three dimensions, and the metal may be at least partially interconnected.

A solid, liquid or vapor-phase oxidant, or a combination of such oxidants, may be employed, as noted above. For example, typical vapor-phase oxidants include, without limitation, oxygen, nitrogen, a halogen, sulphur, phosphorus, arsenic, carbon, boron, selenium, tellurium, and compounds and combinations thereof, for example, silica (as a source of oxygen), methane, oxygen, ethane, propane, acetylene, ethylene, propylene (the hydrocarbon as a source of carbon), and mixtures such as air, $H_2/H_2O$ and $CO/CO_2$, the latter two (i.e., $H_2/H_2O$ and $CO/CO_2$) being useful in reducing the oxygen activity of the environment. Although any suitable oxidants may be employed, specific embodiments of the invention are described below with reference to use of vapor-phase oxidants. If a gas or vapor oxidant, i.e., a vapor-phase oxidant, is used, the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which typically contains about 96 volume percent nitrogen and about 4 volume percent hydrogen.

When a solid oxidant is employed, it is usually dispersed through the entire bed of filler or through a portion of the bed adjacent the parent metal, in the form of particulates admixed with the filler, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal the resulting oxidation reaction product is aluminum boride.

In some instances, the oxidation reaction may proceed so rapidly with a solid oxidant that the oxidation reaction product would tend to fuse due to the exothermic nature of the process. Such an occurrence could degrade the microstructural uniformity of the ceramic body. This rapid exothermic reaction is avoided by mixing into the composition the relatively inert dross as filler which exhibits low reactivity. Such a filler absorbs the heat of reaction to minimize any thermal runaway effect. Other inert fillers can also be combined with the comminuted dross filler to further modify properties of the composite formed and/or further temper the exothermic reaction process.

If a liquid oxidant is employed, the entire filler or a portion thereof adjacent the molten metal is coated or soaked as by immersion in the oxidant to impregnate the filler. Reference to a liquid oxidant means one which is a liquid under the oxidation reaction conditions and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Examples of liquid oxidants as herein defined include low-melting glasses.

A particularly effective method for practicing this invention involves forming the filler into a preform with a shape corresponding to the desired geometry of the final composite product. The preform may be prepared by any of a wide range of conventional ceramic body formation methods (such as uniaxial pressing, slip casting, sedimentation casting, tape casting, injection molding, filament winding for fibrous materials, etc.) depending largely on the characteristics of the filler. Initial binding of the particles prior to infiltration may be obtained through light sintering or by use of various organic or inorganic binder materials which do not interfere with the process or contribute undesirable by-products to the finished material. The preform is manufactured to have sufficient shape integrity and green strength, and should be permeable to the transport of oxidation reaction product, preferably having a porosity of between about 5 and 90% by volume and more preferably between about 25 and 50% by volume. Also, an admixture of filler materials and mesh sizes may be used. The preform is then contacted with molten parent metal on one or more of its surfaces for a time sufficient to complete growth and infiltration of the preform to its surface boundaries.

As disclosed in U.S. Pat. No. 4,923,832, assigned to the same assignee, a barrier means may be used in conjunction with the filler material or preform to inhibit growth or development of the oxidation reaction product beyond the barrier. Suitable barrier means may be any material, compound, element, composition, or the like, which, under the process conditions of this invention, maintains some integrity, is not volatile, and preferably is permeable to the vapor-phase oxidant, if one is employed, while being capable of locally inhibiting, poisoning, stopping, interfering with, preventing, or the like, continued growth of oxidation reaction product. Suitable barriers for use with aluminum parent metal include calcium sulfate (Plaster of Paris), calcium silicate, and Portland cement, and mixtures thereof, which typically are applied as a slurry or paste to the surface of the filler material. These barrier means also may include a suitable combustible or volatile material that is eliminated on heating, or a material which decomposes on heating, in order to increase the porosity and oxidant permeability of the barrier means. Still further, the barrier means may include a suitable refractory particulate to reduce any possible shrinkage or cracking which otherwise may occur during the process. Such a particulate having substantially the same coefficient of expansion as that of the filler bed or preform is especially desirable. For example, if the preform comprises alumina and the resulting ceramic comprises alumina, the barrier may be admixed with alumina particulate, desirably having a mesh size of about 20-1000, but may be still finer.

As a result of using a preform, especially in combination with a barrier means, a net shape is achieved closely resembling that desired in the final product, thus minimizing or eliminating expensive final machining or grinding operations.

As a further embodiment of the invention and as explained in the Commonly Owned Patent Applications, and Patents the addition of dopant materials in conjunction with the parent metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the parent metal (1) may be provided as alloying constituents of the parent metal, (2) may be applied to at least a portion of the surface of the parent metal, or (3) may be applied to the filler bed or preform or to a part thereof, e.g., the support zone of the preform, or any combination of two or more of techniques (1), (2), and (3) may be employed. For example, an alloyed dopant may be used in combination with an externally applied dopant. In the case of technique (3), where a dopant or dopants are applied to the filler bed or preform, the application may be accomplished in any suitable manner, such as by dispersing the dopants throughout part or the entire mass of the preform as coatings or in particulate form, preferably including at least a portion of the preform adjacent the parent metal. Application of any of the dopants to the preform may also be accomplished by applying a layer of one or more dopant materials to and within the preform, including any of its internal openings, interstices, passageways, intervening spaces, or the like, that render it permeable. A convenient manner of applying any of the dopant material is to merely soak the entire bed in a liquid (e.g., a solution) of dopant material. As explained above, the dopant may be built into the filler which is used in producing the final composite product. A source of the dopant may also be provided by placing a rigid body of dopant in contact with and between at least a portion of the parent metal surface and the preform. For example, a thin sheet of silicon-containing glass (useful as a dopant for the oxidation of an aluminum parent metal) can be placed upon a surface of the parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable preform occurs. In the case where the dopant is externally applied to at least a portion of the surface of the parent metal, the polycrystalline oxide structure generally grows within the permeable preform substantially beyond the dopant layer (i.e., to beyond the depth of the applied dopant layer). In any case, one or more of the dopants may be externally applied to the parent metal surface and/or to the permeable preform. Additionally, dopants alloyed within the parent metal and/or externally applied to the preform. Thus, any concentration deficiencies of the dopants alloyed within the parent metal and/or externally applied to the parent metal may be augmented by additional concentration of the respective dopant(s) applied to the preform and vice versa.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1-10% by weight based on the total weight of the resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting polycrystalline oxidation reaction product growth, for aluminum-based parent metal systems particularly where air or oxygen is used as the oxidant are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be used in very small amounts in the parts per million range, typically about 100-200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable preform in selected areas. Thus, growth of the polycrystalline ceramic material can be controlled by the localized placement of a dopant material upon the parent metal surface. The applied coating or layer of dopant is thin relative to the thickness of the parent metal body, and growth or formation of the oxidation reaction product into the permeable preform extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram of parent metal, or about 0.0001 gram of silicon per square centimeter of exposed parent metal surface, together with a second dopant having a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than about 0.0008 gram of Mg per gram of parent metal to be oxidized and greater than 0.003 gram of Mg per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

It is found that aluminum dross beds and preforms are readily permeable to the oxidation reaction product growth and vapor-phase oxidants, and are thus highly suitable for use in forming composite ceramic articles by the above-described procedure. Substantially inert constituents of the dross, such as alumina, are very satisfactory filler materials for incorporation in such articles. Unreacted metal initially present in the dross is unobjectionable, although as stated, the ceramic matrix formation in the method of the invention chiefly or primarily involves reaction of vapor-phase oxidant with the parent metal.

The advantages of using metal dross as the filler material are that in at least many instances it contains substances capable of performing the function of dopants and of tailoring the metallic component of the ceramic-metal article. Using constituents of the dross as dopants, where such are required, obviates the addition of dopants either by alloying in the parent metal body or otherwise. Also, the unreacted metal in the dross can impart one or more desirable characteristics to the resulting products, for example, strength fracture toughness, thermal conductivity, or electrical conductivity. The type of dross used can be chosen for its constituents, and thus for its ability to augment the qualities of the parent metal and influence the properties and cost features of the resulting composite.

Another advantage is the inherent wettability of the dross by the parent metal and the oxidation reaction products. The wettability of the filler is a necessary condition for the infiltration of the filler by the reaction products and for the formation of a coherent ceramic composite. The elements found typically in dross such as MgO and alkali metal oxides are potent wetting agents under the process conditions in the case of employing aluminum parent metals.

EXAMPLES

An aluminum ingot as parent metal was buried in a bed of commununted dross obtained from an aluminum melt, and was totally consumed by the oxidation reaction on heating to and holding at 1550° C. in an atmosphere of $N_2$, leaving a cavity essentially corresponding to the shape of the aluminum ingot. The dross was ground to a minus 65 mesh (Tyler). The bed had been infiltrated by the oxidation reaction product of the parent aluminum ingot with the $N_2$, and x-ray diffraction analysis of the resulting ceramic composite showed the presence of aluminum nitride and alumina spinel.

Tests were made using two types of dross ground to a minus 65 mesh (Tyler), one being a dross formed on molten 99.7% pure aluminum subjected to chlorination as a conventional scavenging procedure, and the other being a dross formed on Al-5% Mg alloy. In each instance the parent metal was aluminum and the vapor-phase oxidant was a nitrogen atmosphere. With the dross from the pure metal, composite development occurred through a larger volume of the dross body than in the case of the dross from the 5% Mg alloy.

In the former of these tests, an aluminum ingot 6.8 mm × 8 mm × 21 mm high was buried, at the center of a crucible having an internal diameter of 30 mm, in a crucible-filling body of the dross from the 99.7% pure aluminum, and nitrided at 1550° C. for eight hours with a nitrogen flow of 500 cc/min. The nitrogen was dried and deoxygenated. On cooling, a cavity was observed at the center of the dross bed, and the bed had been infiltrated by an oxidation reaction product to yield a composite of the present invention. X-ray diffraction analysis showed the presence of aluminum nitride.

In the latter of these tests, using the same dross and nitrogen flow rate, an aluminum ingot 10 mm in diameter and 24 mm high was buried in a bed of the dross in the crucible and nitrided under the following heating schedule: 1 hour at 700° C., 1 hour at 1100° C., 7 hours at 1550° C. Results were very similar to the preceding test.

It is to be understood that the invention is not limited to the features and embodiments hereinabove specifically set forth, but may be carried out in other ways without departure from its spirit.

We claim:

1. A method for producing a self-supporting ceramic composite body, said ceramic composite body comprising (1) a ceramic matrix obtained by oxidation of a parent metal comprising at least one metal selected from the group consisting of aluminum, tin, silicon, titanium, zirconium and hafnium to form a polycrystalline material comprising an oxidation reaction product of said parent metal with at least one oxidant and (2) at least one filler material comprising at least one dross material embedded by said ceramic matrix, the method comprising the steps of:
- (a) comminuting at least one dross material, said dross material being obtained from a metal melting operation and said dross material being derived from dross forming metals selected from the group consisting of aluminum, titanium, zinc, magnesium, copper and alloys thereof;
- (b) chemically treating said at least one comminuted dross material to remove at least a portion of at least one metal component from said at least one dross material;
- (c) providing said at least one comminuted and chemically treated dross material as at least a portion of a permeable mass of at least one filler material;
- (d) orienting a parent metal comprising at least one metal selected from the group consisting of aluminum, tin, silicon, titanium, zirconium and hafnium and said permeable mass of said at least one filler material comprising said dross material relative to each other so that formation of said oxidation reaction product will occur in a direction towards and into said mass of at least one filler material comprising said dross material;
- (e) heating said parent metal to a temperature above its melting point but below the melting point of said oxidation reaction product to form a body of molten parent metal and reacting the molten parent metal with at least one oxidant at said temperature to form said oxidation reaction product, and at said temperature maintaining at least a portion of said oxidation reaction product in contact with and extending between said body of molten metal and said oxidant, to draw molten metal through the oxidation reaction product towards said at least one oxidant and towards and into the adjacent mass of at least one filler material comprising said dross material so that oxidation reaction product continues to form within the mass of at least one filler material comprising said dross material at an interface between said at least one oxidant and previously formed oxidation reaction product; and
- (f) continuing said reacting for a time sufficient to infiltrate at least a portion of said mass of at least one filler material comprising said dross material with said oxidation reaction product.

2. A method for producing a self-supporting ceramic composite body, said ceramic composite body comprising (1) a ceramic matrix obtained by oxidation of a parent metal to form a polycrystalline material comprising an oxidation reaction product of said parent metal with at least one oxidant and (2) at least one filler material comprising at least one nitride dross material embedded by said ceramic matrix, the method comprising the steps of:
- (a) comminuting at least one nitride dross material, said nitride dross material being obtained from a metal melting operation and said nitride dross material being derived from dross forming metals selected from the group consisting of aluminum, silicon, titanium, zirconium and alloys thereof;
- (b) chemically treating said at least one comminuted nitride dross material to remove at least a portion of at least one metal component from said at least one nitride dross material;
- (c) providing said at least one comminuted and chemically treated nitride dross material as at least a portion of a permeable mass of at least one filler material;
- (d) orienting a parent metal and said permeable mass of said at least one filler material comprising said dross material relative to each other so that formation of said oxidation reaction product will occur in a direction towards and into said mass of at least one filler material comprising said dross material;
- (e) heating said parent metal to a temperature above its melting point but below the melting point of said oxidation reaction product to form a body of molten parent metal and reacting the molten parent metal with at least one oxidant comprising a nitrogen-containing gas at said temperature to form said oxidation reaction product, and at said temperature maintaining at least a portion of said oxidation reaction product in contact with and extending between said body of molten metal and said oxidant, to draw molten metal through the oxidation reaction product towards said at least one oxidant and towards and into the adjacent mass of at least one filler material comprising said dross material so that oxidation reaction product continues to form within the mass of at least one filler material comprising said dross material at an interface between said at least one oxidant and previously formed oxidation reaction product; and
- (f) continuing said reacting for a time sufficient to infiltrate at least a portion of said mass of at least one filler material comprising said dross material with said oxidation reaction product.

3. The method of claim 2, wherein said nitride dross material is derived by contacting said dross forming metal with a nitrogen-bearing atmosphere.

4. The method of claim 1, wherein said dross material contains at least one value selected from the group consisting of magnesium values, silicon values, iron values, nickel values and mixtures thereof.

5. The method of claim 1, further comprising utilizing a dopant material.

6. The method of claim 5, wherein said dross material contains said dopant material.

7. The method of claim 1, wherein said permeable mass of at least one filler material comprises a mixture of said dross material and at least one other filler material.

8. The method of claim 2, wherein said parent metal comprises at least one metal selected from the group consisting of aluminum, silicon, titanium, zirconium and hafnium.

9. The method of claim 1, wherein said oxidant comprises a nitrogen-containing gas and the oxidation reaction product comprises aluminum nitride.

10. The method of claim 1, wherein said oxidant comprises an oxygen-containing gas and said oxidation reaction product comprises aluminum oxide.

11. The method of claim 1, wherein said dross material is derived by air oxidation of said dross forming metals or alloys.

12. The method of claim 1, wherein said dross material is derived by contacting the dross forming metal with a nitrogen-bearing atmosphere.

13. The method claim 1, where said permeable mass of at least one filler material is formed into a permeable preform.

14. The method of claim 13, wherein said permeable preform includes a barrier which defines the desired termination surface thereof.

15. The method of claim 1, wherein said oxidant is selected from the group consisting of an oxygen-containing gas, a nitrogen-containing gas, a halogen, sulphur, phosphorus, arsenic, carbon, boron, selenium, tellurium, an $H_2/H_2O$ mixture, methane, ethane, propane, acetylene, ethylene, propylene, silica, and a $CO/CO_2$ mixture, or compounds or mixtures thereof.

* * * * *